(12) United States Patent
Masuda

(10) Patent No.: US 10,416,287 B2
(45) Date of Patent: Sep. 17, 2019

(54) LASER DEVICE

(71) Applicant: Funai Electric Co., Ltd., Osaka (JP)

(72) Inventor: Yuichiro Masuda, Takatsuki (JP)

(73) Assignee: Funai Electric Co., LTD., Osaka (JP)

( * ) Notice: Subject to any disclaimer, the term of this patent is extended or adjusted under 35 U.S.C. 154(b) by 402 days.

(21) Appl. No.: 15/345,048

(22) Filed: Nov. 7, 2016

(65) Prior Publication Data

US 2017/0131386 A1    May 11, 2017

(30) Foreign Application Priority Data

Nov. 5, 2015  (JP) .................. 2015-217832

(51) Int. Cl.
*G01S 7/481*    (2006.01)
*G01S 17/08*    (2006.01)

(52) U.S. Cl.
CPC .......... *G01S 7/4812* (2013.01); *G01S 7/4813* (2013.01); *G01S 7/4817* (2013.01); *G01S 17/08* (2013.01)

(58) Field of Classification Search
CPC ................................ G02B 26/10; G01S 7/481
See application file for complete search history.

(56) References Cited

U.S. PATENT DOCUMENTS

| | | | |
|---|---|---|---|
| 4,916,536 A | 4/1990 | Kerr et al. | |
| 8,830,484 B2* | 9/2014 | Kereth | G01S 7/4811 356/607 |
| 2004/0212863 A1* | 10/2004 | Schanz | G01S 7/4817 359/211.2 |
| 2004/0233491 A1* | 11/2004 | Schanz | G01S 7/4813 359/211.2 |
| 2004/0240020 A1* | 12/2004 | Schanz | G01S 7/4811 359/211.2 |
| 2007/0035954 A1* | 2/2007 | Schanz | B60S 1/0822 362/464 |
| 2008/0007710 A1 | 1/2008 | Zambon | |
| 2011/0235018 A1 | 9/2011 | Mori et al. | |
| 2014/0332676 A1 | 11/2014 | Bayha et al. | |

FOREIGN PATENT DOCUMENTS

| | | |
|---|---|---|
| CN | 101149940 A | 3/2008 |
| CN | 104081221 A | 10/2014 |
| JP | 2009/109310 A | 5/2009 |
| JP | 2011-059111 A | 3/2011 |
| JP | 2012-208059 A | 10/2012 |
| JP | 2015/143620 A | 8/2015 |
| WO | 2015/082217 A2 | 6/2015 |

OTHER PUBLICATIONS

Office Action issued in Chinese Application No. 201610962336.5, dated Nov. 5, 2018 (5 pages).
Extended European Search Report issued in corresponding European Application No. 16197318.5 dated Mar. 31, 2017 (8 pages).

* cited by examiner

*Primary Examiner* — Hovhannes Baghdasaryan
(74) *Attorney, Agent, or Firm* — Osha Liang LLP

(57) ABSTRACT

A laser device includes a transmitter that emits a light, a first reflector that pivotally reflects the light by a shaft, a light receiver provided apart from the transmitter in a first direction parallel to the shaft, a guide part that receives the light from the first reflector and changes a direction of the light in the first direction, and a second reflector that reflects a returning light from an object and pivots in sync with the first reflector.

15 Claims, 14 Drawing Sheets

LASER DEVICE

BACKGROUND

Technical Field

The present invention generally relates to a laser device (measuring apparatus) for measuring distance to a target object by using light.

Related Art

Conventional measuring apparatuses measure distance to a target object by using a moveable mirror to deflect and emit a measuring light in a plurality of directions, thereby receiving the returning light of the measuring light as reflected by the target object via the moveable mirror.

As an example, a measuring apparatus for what is called a coaxial optical system is known, whereby the measuring light and the returning light enters and exits along the same optical axis by using an optical element such as a prism or mirror and the like, aligning the central axis of a light transmitter and the central axis of a light receiver (for example, refer to patent documents 1, 2).

Patent Literature 1: Japanese Patent Application Publication No. 2011-59111

Patent Literature 2: Japanese Patent Application Publication No. 2012-208059

SUMMARY

Laser devices that employ a coaxial optical system do not have measurement errors due to a parallax of the light transmitter and the light receiver because the optical axis of the measuring light and the optical axis of the returning light are aligned, however there is a disadvantage in that it is difficult to remove stray light interference wherein stray light generated by the measuring light being diffusely reflected in the housing wraps around the light receiver. This stray light interference is a possible cause for measurement errors.

One or more embodiments of the present invention provide a laser device for reducing the parallax of the light transmitter and the light receiver, and for decreasing stray light interference.

According to one or more embodiments of the present invention, a laser device may comprise: a light transmitter for emitting light, a first reflector for reflecting the light, supported and oscillated by an oscillating shaft, a light receiver provided apart from the light transmitter in the direction of the oscillating shaft, an guide part for receiving the light from the first reflector and emitting from a position closer to the light receiver in the direction of the oscillating shaft, and a second reflector for reflecting the returning light from the target object of the light emitted from the guide part to the light receiver, and oscillating in sync with the first reflector.

Accordingly, the light after being reflected by the first reflector may be shifted and emitted to a position close to the light receiver. As a result, light may be blocked between the first reflector and the second reflector, and the light and returning light may be separated, thereby decreasing the degree of wraparound of the stray light generated by the first reflector around the light receiver. Furthermore, the parallax of the light transmitter and the light receiver may be also reduced, as the emitting position of the light is brought closer to the light receiver.

According to one or more embodiments of the present invention, the first reflector and the second reflector are disposed on a same plane, and may be supported by the same oscillating shaft and oscillated.

Accordingly, the first reflector and the second reflector that oscillate in sync may be implemented in a relatively simple configuration.

According to one or more embodiments of the present invention, the laser device further includes a housing, having a window for the light and the returning light to pass through, and the guide part may be provided on the window.

Accordingly, blocking of stray light generated within the housing becomes easier, as the optical path of the light and the optical path of the returning light may be separated in the inside of the housing.

According to one or more embodiments of the present invention, the guide part has a first reflection part and a second reflection part that are facing, and the first reflection part may be disposed in a position where the window and the light intersect, and the second reflection part may be disposed in a position where the first reflection part is in parallel displacement close to the light receiver.

Accordingly, the guide part may be specifically configured to emit the light input to the first reflection part from the second reflection part.

According to one or more embodiments of the present invention, the second reflection part may be provided in the same position as the central axis of the light receiver in the direction of the oscillating shaft.

Accordingly, the parallax of the light transmitter and the light receiver may be minimized, as the position of the emitting position of the light and central axis of the light receiver conform in the direction of the oscillating shaft.

According to one or more embodiments of the present invention, the second reflection part may be provided in a different position to the central axis of the light receiver in the direction of the oscillating shaft.

Accordingly, inconveniences where the second reflection part becomes an obstacle, and the input amount of the light receiver of the returning light is decreased may be reduced, as the second reflection part is disposed in a position offset from the central axis of the light receiver.

Furthermore, the second reflection part may be moveably installed in the direction of the oscillating shaft.

Accordingly, the distance to a target object positioned in a plurality of different distance measurement surfaces in the direction of the oscillating shaft may be measured by moving the second reflection part.

According to one or more embodiments of the present invention, the laser device further includes a shielding plate within the housing, and the second reflection part may be positioned closer to the light receiver than the shielding plate in the direction of the oscillating shaft.

Accordingly, wraparound of the stray light around the light receiver occurring within the housing is prevented, while the light may be emitted from a position where the optical path of the light receiver of the returning light is not blocked.

According to one or more embodiments of the present invention, a transparent member may be provided on a planar shape parallel to the oscillating shaft.

Accordingly, manufacture may configure the transparent member on a relatively simple flat board.

According to one or more embodiments of the present invention, the transparent member may be provided in a cylindrical shape as the center of the oscillating shaft.

Accordingly, deviation may be minimized in the plane where the resultant light, returning light, and oscillating shaft bisect due to the guide part.

According to one or more embodiments of the present invention, a laser device may comprise a transmitter that emits a light, a first reflector that pivotally reflects the light by a shaft, a light receiver provided apart from the transmitter in a first direction parallel to the shaft, a guide part that receives the light from the first reflector and changes a direction of the light in the first direction, and a second reflector that reflects a returning light from an object and pivots in sync with the first reflector.

The laser device according to one or more embodiments of the present invention may reduce the parallax of the light transmitter and the light receiver, and decrease stray light interference.

DETAILED DESCRIPTION

Figure 1:
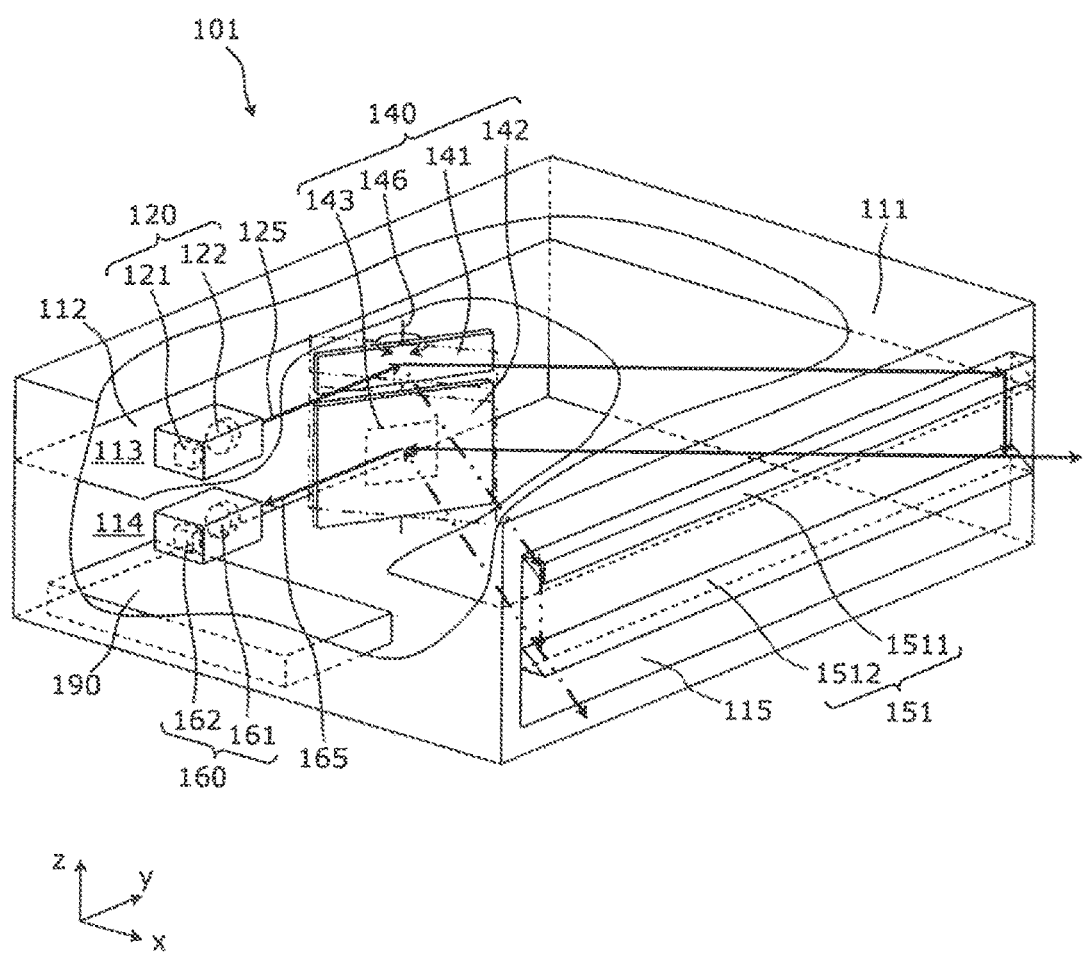
FIG. 1 is a cutout perspective view drawing illustrating one example of a configuration of the laser device according to a first embodiment of the present invention.

Embodiments of the present invention will be described in detail with reference to drawings.

In the following description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In addition, all drawings referred to in the following are schematic diagrams, and are not necessarily exactly as illustrated. In each drawing, configurations that are substantially the same are denoted by the same reference numerals, and repeated descriptions are omitted or simplified.

Furthermore, the terms parallel and perpendicular as used in the following should be interpreted as approximately parallel and approximately perpendicular respectively. These terms denote being parallel and perpendicular with regard to design, and realistic measuring errors that occur due to member shape or assembly in the present laser device may be included.

The laser device according to a first embodiment of the present invention is a laser device for measuring a distance to a target object, by moving a measurement light that is emitted from a light transmitter by a light transmitting mirror (first reflector), scanning the range area, and receiving a returning light of the measuring light from the target object by a light receiver via a light receiving mirror (second reflector). The laser device may be called a measuring apparatus. The laser device separates the optical path of the measuring light and the optical path of the returning light that is reflected by the oscillating mirror, decreasing stray light interference, while an optical axis shift part (guide part) is provided for shifting the optical axis of the measuring light close to the light receiver in the latter stage of the oscillating mirror.

First, the laser device configuration according to the first embodiment of the present invention will be described.

FIG. 1 is a cutout perspective view drawing illustrating one example of a configuration of the laser device 101.

As illustrated in FIG. 1, the laser device 101 is provided with a housing 111, a light transmitter 120, a deflection part 140, an optical axis shift part 151, a light receiver 160, and a control part 190.

The housing 111 is a box configuring the exterior of the laser device 101, and it houses the light transmitter 120, the deflection part 140, the light receiver 160, and the control part 190. The housing 111 may, for example, be configured by resin or metal. A light transmitting region 113 and a light receiving region 114 is partitioned by a shielding plate 112 in the internal space of the housing 111. The light transmitting region 113 is a region where primarily a measuring light 125 passes through, and the light receiving region 114 is a region where primarily a returning light 165 passes through.

The internal space and the external space of the housing 111 (in short, the range area) is divided, while a housing window 115 is provided, configured of a transparent member where the measuring light 125 and the returning light 165 pass through. The housing window 115 may, for example, be a flat board made of resin or glass.

The light transmitter 120 is an optical system for emitting the measuring light 125, and has a light source 121. The light source 121 may, for example, be configured of a laser diode. The light transmitter 120 may have a collimating lens 122 for collimating the measuring light 125, and may have a slit (not illustrated) for regulating the emitting direction of the measuring light 125.

Here, the optical axis of the measuring light 125 that faces a light transmitting mirror (first reflector) 141 emitted from the light transmitter 120 is defined as the central axis of the light transmitter 120. For the convenience of explanation, the direction of the central axis of the light transmitter 120 will be referred to as the y-axis.

The deflection part 140 scans the range area using the measuring light 125 that is emitted from the light transmitter 120, and is an optical system including a moveable mirror for guiding the returning light 165 from the target object in the range area to the light receiver 160. The deflection part 140 is supported by an oscillating shaft 146, and has the light transmitting mirror 141 and a light receiving mirror (second reflector) 142 for oscillating due to torque applied by an actuator 143.

The light transmitting mirror 141 and the light receiving mirror 142 may, for example, be configured of a metal film mirror, and may also be disposed on the same plane. The oscillating shaft 146 may, for example, be formed by punching through the thin metal film. For the convenience of explanation, a direction parallel to the oscillating shaft 146 shall be referred to as the z-axis, and the position of the z-axis direction will be referred to as the height.

The reverse of each of the light transmitting mirror 141 and the light receiving mirror 142 (opposite surface of the reflective surface) may, for example, be fixed to the oscillating shaft 146 by an adhesive or the like, and further, may be fixed to the housing 111 via a fixing part (not illustrated) provided on the upper and lower ends of the oscillating shaft 146.

The actuator 143, as an example, may be an actuator using electromagnetic force, electrostatic force, or piezoelectric displacement as the torque source. For example, due to the actuator 143 generating cyclic torque, resonance occurs in the oscillating shaft 146 as a torsion bar, and the light transmitting mirror 141 and the light receiving mirror 142 oscillate around the z-axis.

The light transmitting mirror 141 scans the range area with the measuring light 125 from the light transmitter 120 by oscillating.

The optical axis shift part 151 receives the measuring light 125 after being reflected in the light transmitting mirror 141, and is an optical system for emitting the received measuring light 125 from a close height by the light receiver 160. The optical axis shift part 151 may, for example, be configured of a first reflection part 1511 and a second reflection part 1512 that are facing, and may be provided on the housing window 115. Detailed configuration of the optical axis shift part 151 will be described later.

The measuring light 125 emitted from the optical axis shift part 151 arrives at the target object (not illustrated) within the range area, and is diffusely reflected by the target object.

With regard to the measuring light 125 that is diffusely reflected by the target object, the returning light 165 that returns towards the laser device 101 passes through the housing window 115 of the laser device 101, and is input to the inside of the housing 111. The light receiving mirror 142 reflects the returning light 165 to the light receiver 160.

The light receiver 160 is an optical system for exchanging the returning light 165 reflected in the light receiving mirror 142 to a received signal, and has a light receiving element 162. The light receiving element 162 may, for example, be configured of an avalanche photodiode. The light receiver 160 may have a condenser lens 161 for condensing the returning light 165 to the light receiving element 162, and may have a band-pass filter (not illustrated) for removing wavelength noise light other than the measuring light 125. The light receiver 160 is provided apart from the light transmitter 120 in a height wise direction.

Here, the optical axis of light input to the light receiver from the light receiving mirror 142 and condensed in the light receiving element 162 is defined as the central axis of the light receiver 160. The central axis of the light receiver 160 may, for example, be the central axis of the condenser lens 161, and may be parallel to the central axis of the light transmitter 120.

The control part 190 is a controller for controlling distance measurement operation in the laser device 101. The control part 190 drives the light source 121 and the actuator 143, and calculates the distance to the target object from the laser device 101 by processing the received signal from the light receiving element 162.

The control part 190, for example, may be implemented by a combination of software function, carried out by a drive circuit for supplying a drive signal to the light source 121 and the actuator 143, a hardware function such as a signal processing circuit for receiving and processing a signal from the light receiving element 162, and a microcomputer executing a predetermined program.

The control part 190, specifically, based on phase contrast between the received signal from the light receiving element 162 and the drive signal supplied to the light source 121, round trip time from the laser device 101 of the measuring light 125 to the target object is requested, and the distance to the target object may be calculated. Furthermore, the control part 190 may specify the direction of the target object within the range area from the angle of rotation (hereinafter referred to as the inclination) of around the oscillating shaft 146 of the light transmitting mirror 141.

Next, configurations of the optical axis shift part 151 will be described.

Figure 2:
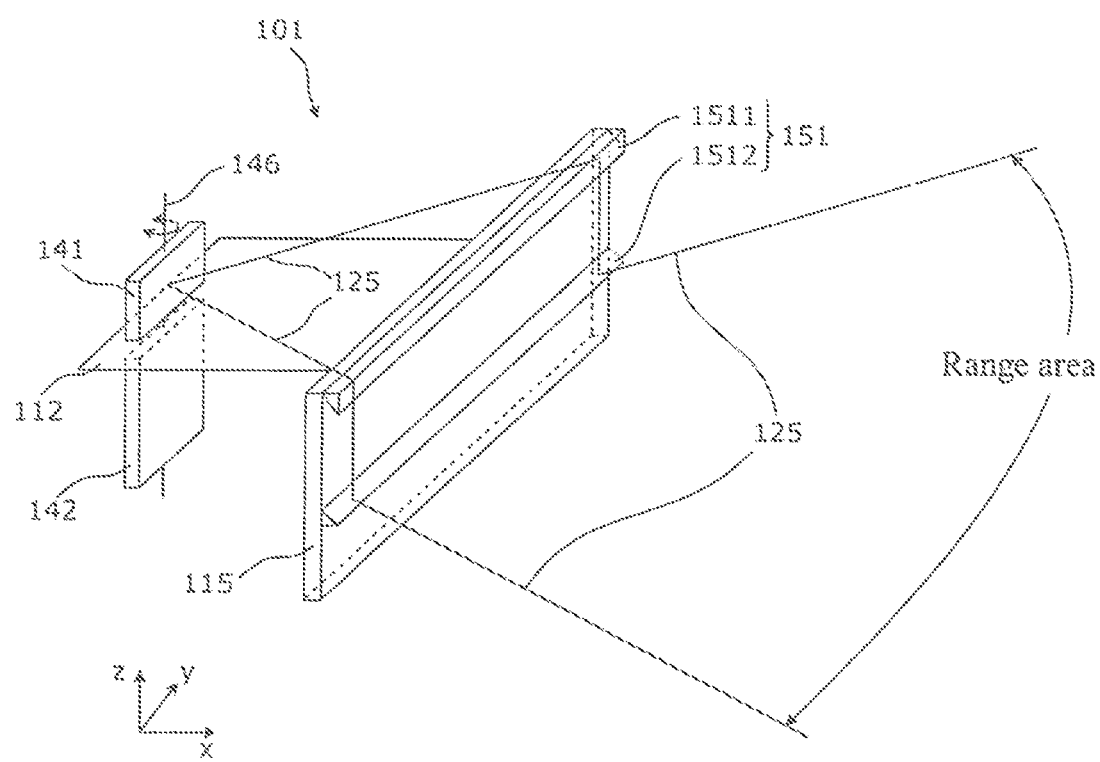
FIG. 2 is a perspective view drawing illustrating one example of a detailed configuration of the optical axis shift part according to the first embodiment of the present invention.

FIG. 2 is a perspective view drawing illustrating an example of a detailed configuration of the optical axis shift part 151.

As illustrated in FIG. 2, the first reflection part 1511 of the optical axis shift part 151 is disposed in a position where the housing window 115 and the measuring light 125 intersect. Specifically, the first reflection part 1511 is provided on the height of the central axis of the light transmitter 120, on the outer surface of the housing window 115, and it may have a long mirror, having a reflective surface, forming an outer surface for the housing window 115 at a 45-degree angle.

Furthermore, the second reflection part 1512 is disposed in a position displaced parallel to the first reflection part 1511, close to the light receiver 160. Specifically, the second reflection part 1512 is provided parallel to the first reflection part 1511 of the outer surface of the housing window 115, and on a lower position than the first reflection part 1511, and it may have a long mirror, having a reflective surface, forming an outer surface for the housing window 115 at a 135-degree angle.

The first reflection part 1511 and the second reflection part 1512 may, for example, be held at each end by a holding member (not illustrated) provided on the housing 111, and may be fixed in the aforementioned position of the housing window 115.

Accordingly, the optical axis of the measuring light 125 after being reflected by the light transmitting mirror 141 is bent in a direction parallel to the outer surface of the housing window 115 by the first reflection part 1511, and is once again bent and emitted in a direction parallel to the optical axis of the original measuring light 125 by the second reflection part 1512. In other words, the optical axis of the measuring light 125 is shifted to a height close to the light receiver 160 (specifically, the central axis of the light receiver 160) by the optical axis shift part 151, as illustrated in FIG. 1.

The optical axis shift part can be configured of a prism in place of a mirror. In the following, a modified example of such an optical axis shift part will be described.

Figure 3:
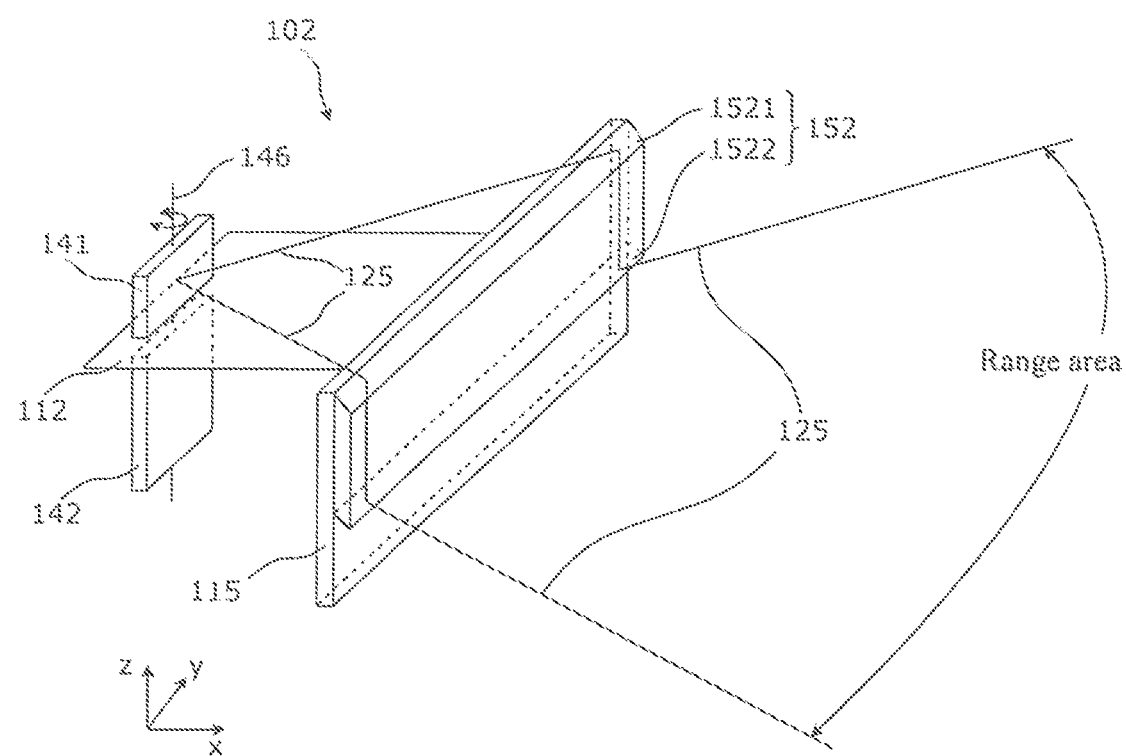
FIG. 3 is a perspective view drawing illustrating one example of a detailed configuration of the optical axis shift part according to the first embodiment of the present invention.

FIG. 3 is a perspective view drawing illustrating an example of a detailed configuration of the optical axis shift part 152 according to the modified example.

As illustrated in FIG. 3, the optical axis shift part 152 is configured of one prism, and a first reflection part 1521 and a second reflection part 1522 are a pair of reflective surfaces provided on the prism.

The first reflection part 1521 is disposed in a position where the housing window 115 and the measuring light 125 intersect. Specifically, the reflective surface as the first reflection part 1521 may form the outer surface of the housing window 115 at a 45-degree angle.

Furthermore, the second reflection part 1522 is disposed in a position displaced parallel to the first reflection part 1521, close to the light receiver 160. Specifically, the reflective surface as the second reflection part 1522 may form the outer surface of the housing window 115 at a 135-degree angle.

The optical axis shift part 152 may, for example, be adhered to the housing window 115, or be held at each end by a holding member (not illustrated) provided on the housing 111, and may be fixed in the aforementioned position.

Accordingly, the optical axis of the measuring light 125 after being reflected by the light transmitting mirror 141 is bent in a direction parallel to the outer surface of the housing window 115 by the first reflection part 1521, and is once again bent and emitted in a direction parallel to the optical axis of the original measuring light 125. In other words, the optical axis of the measuring light 125 is shifted to a height close to the light receiver 160 (specifically, the central axis of the light receiver 160) by the optical axis shift part 152, as illustrated in FIG. 3.

Results obtained by the laser device 101 configured as per the abovementioned will be described based on a comparison of a plurality of comparative examples.

Figure 4:
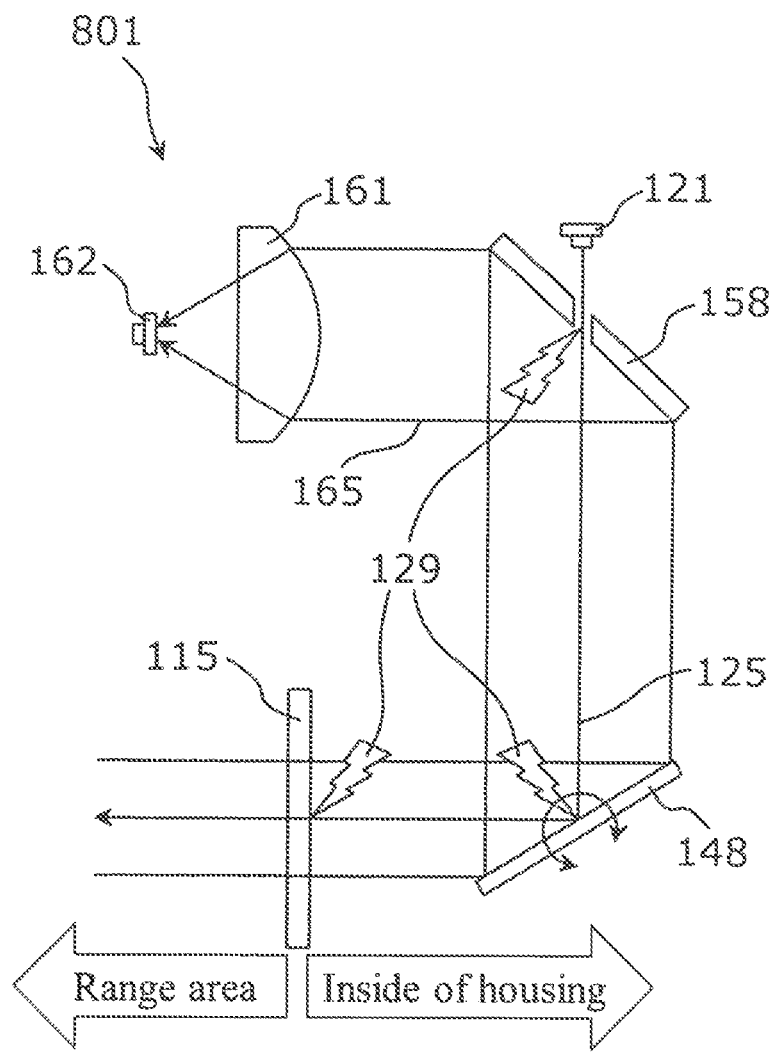
FIG. 4 is a top view drawing illustrating one example of the optical path of the measuring light and returning light of the laser device according to comparative example 1.

FIG. 4 is a top view drawing illustrating an example of the optical path of the measuring light and the returning light of a laser device 801 according to comparative example 1. The laser device 801 is an example of a coaxial optical system laser device stated in the related art. In the laser device 801, the measuring light 125 emitted from the light source 121 and the returning light 165 condensed in the light receiving element 162 by the condenser lens 161 are overlaid on the same optical axis by a perforated mirror 158, and is moved in a plurality of directions by a moveable mirror 148, and then emitted to the range area from the housing window 115. As a result, there is a concern that in the laser device 801, a stray light 129 generated by the inner surface of the perforated mirror 158, the moveable mirror 148 and the housing window 115 cannot be separated from the returning light 165.

Figure 5:
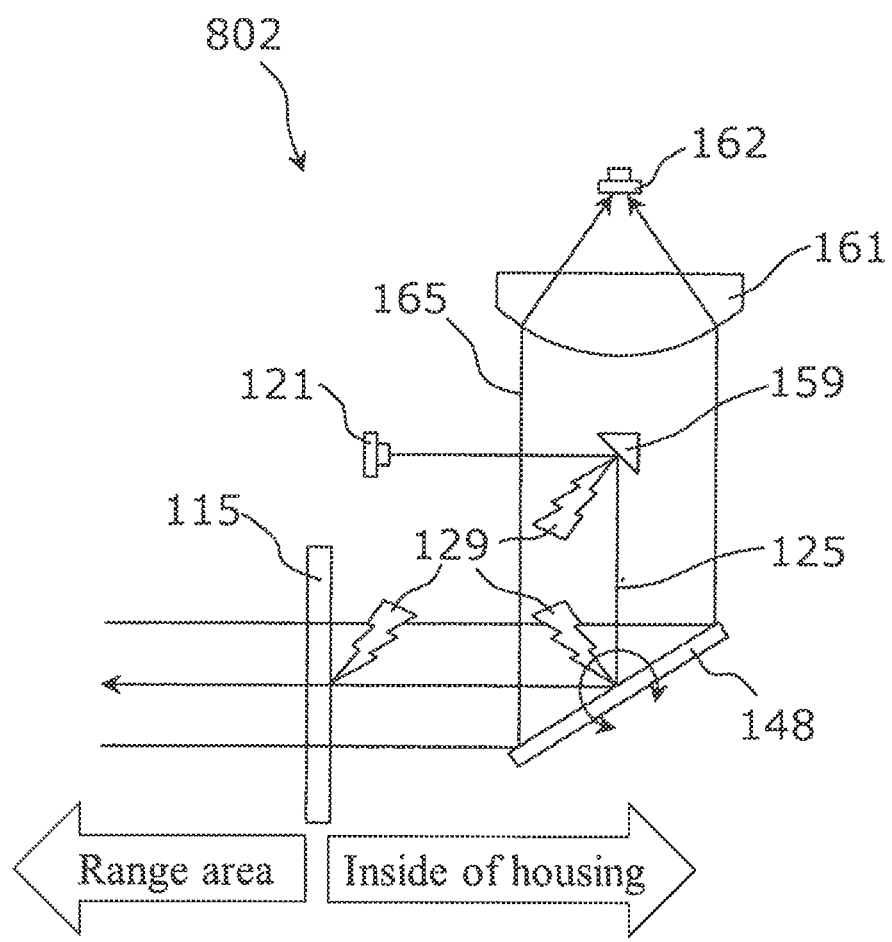
FIG. 5 is a top view drawing illustrating one example of the optical path of the measuring light and returning light of the laser device according to comparative example 2.

FIG. 5 is a top view drawing illustrating an example of the optical path of the measuring light and the returning light of a laser device 802 according to comparative example 2. The laser device 802 is an example of a coaxial optical system laser device stated in the related art. In the laser device 802, the measuring light 125 emitted from the light source 121 and the returning light 165 condensed in the light receiving element 162 by the condenser lens 161 are overlaid on the same optical axis by a mirror 159, is moved in a plurality of directions by the moveable mirror 148, and then emitted to the range area from the housing window 115. As a result, in the laser device 802, there is a concern that the stray light 129 generated by the inner surface of the mirror 159, the moveable mirror 148 and the housing window 115 cannot be separated from the returning light 165.

Accordingly, the inventor has examined a separating optical system laser device for processing the measuring light and the returning light through a separated space within the housing of both, without being disposed on the same optical axis within the housing.

Figure 6:
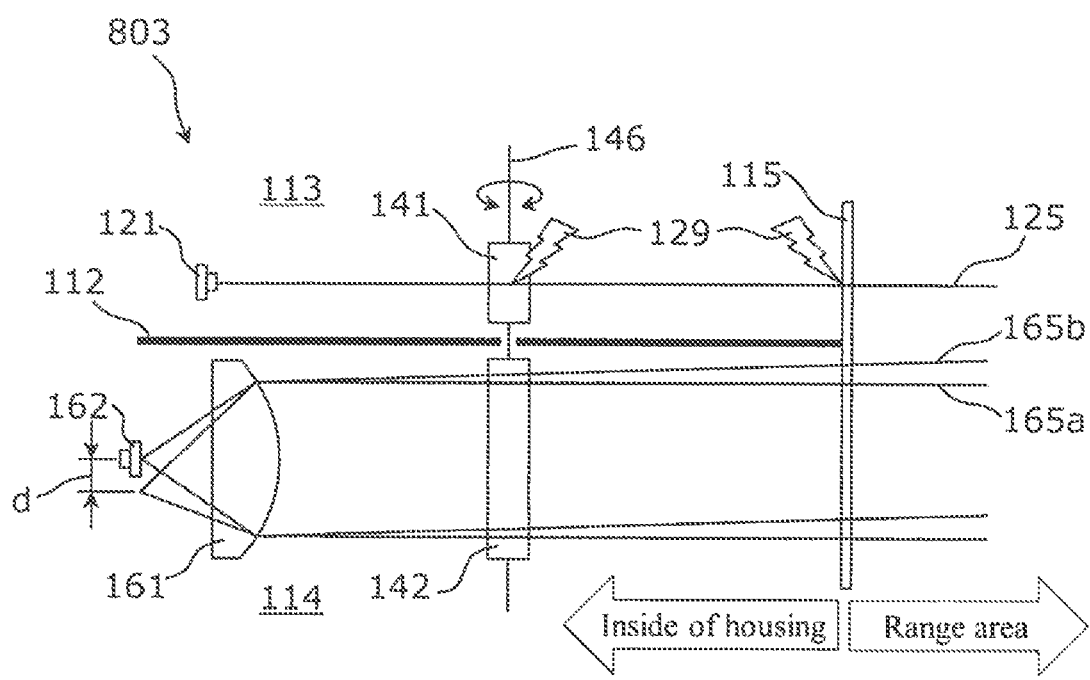
FIG. 6 is a side view drawing illustrating one example of the optical path of the measuring light and returning light of the laser device according to comparative example 3.

FIG. 6 is a side view drawing illustrating an example of the optical path of the measuring light and returning light of a laser device 803 according to comparative example 3. In the laser device 803, the light transmitting region 113 and a light receiving region 114 is partitioned by a shielding plate 112 in the inside of the housing. The light transmitting mirror 141 and the light receiving mirror 142 are provided apart in a height-wise direction, and the shielding plate 112 is also inserted between the light transmitting mirror 141 and the light receiving mirror 142, excluding the vicinity of the oscillating shaft 146.

In the light transmitting region 113, the measuring light 125 emitted from the light source 121 is moved in a plurality of directions by the light transmitting mirror 141, and then emitted to the range area from the housing window 115. Furthermore, in the light receiving region 114, a returning light 165a and 165b input from the housing window 115 is guided to the condenser lens 161 via the light receiving mirror 142, and condensed in the light receiving element 162. Here, the returning light 165a and 165b is the returning light from the long distance target object and the close distance target object respectively.

In this way, in the laser device 803, the measuring light 125 and the returning light 165a and 165b are processed respectively by the light transmitting region 113 and the light receiving region 114 separated from each other by the shielding plate 112. As a result, even in a case where the stray light 129 occurs, wraparound of the stray light 129 around the light receiving element 162 can be prevented.

However, in the laser device 803, a parallax corresponding to the distance to the target object will occur as a result of the measuring light 125 being disposed apart from the central axis (in other words, the central axis of the light receiver 160) of the condenser lens 161.

Specifically, as illustrated in FIG. 6, the condensing point deviates a distance d, due to the returning light 165a from the long distance target object and the returning light 165b of the close distance target object being input to the laser device 803 through a different input angle to each other. Input angle deviation of the returning light 165 corresponding to the target object distance is referred to as the perspective parallax. For example, when the condenser lens 161 and the light receiving element 162 are disposed in combination with the returning light 165a from the long distance target object, the returning light 165b from the close distance target object will not be accurately condensed in the light receiving element 162 as a result of the perspective parallax, and may become a cause of distance measurement errors.

Here, the present inventor proposes a laser device 101 and 102 with an added optical axis shift part 151 and 152 in the laser device 803 according to comparative example 3. The aforementioned stray light interference and perspective parallax may be reduced by the laser device 101 and 102.

Figure 7:
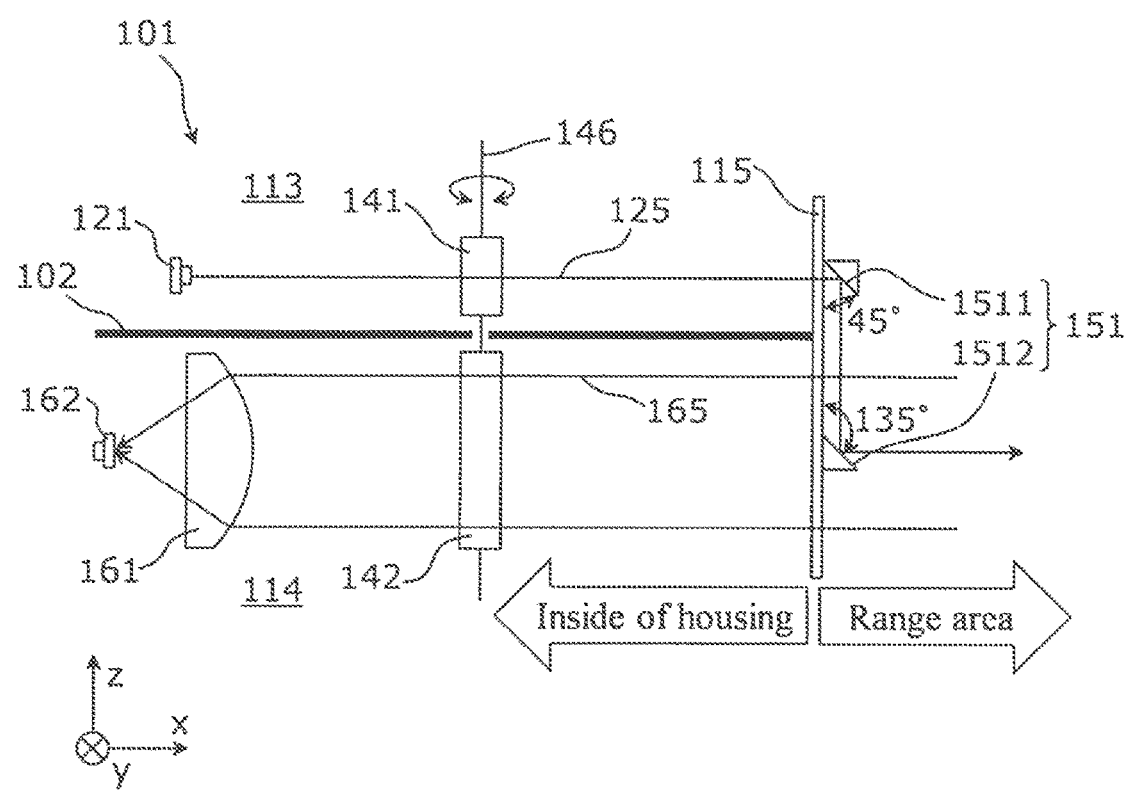
FIG. 7 is a side view drawing illustrating one example of the optical path of the measuring light and returning light of the laser device according to the first embodiment of the present invention.

FIG. 7 is a side view drawing illustrating an example of the optical path of the measuring light and returning light of the laser device 101. The side view drawing of FIG. 7 corresponds to the perspective view drawing of FIG. 2. In the laser device 101, as described above, the optical axis of the measuring light 125 is shifted close to the light receiver 160 by the optical axis shift part 151.

Figure 8:
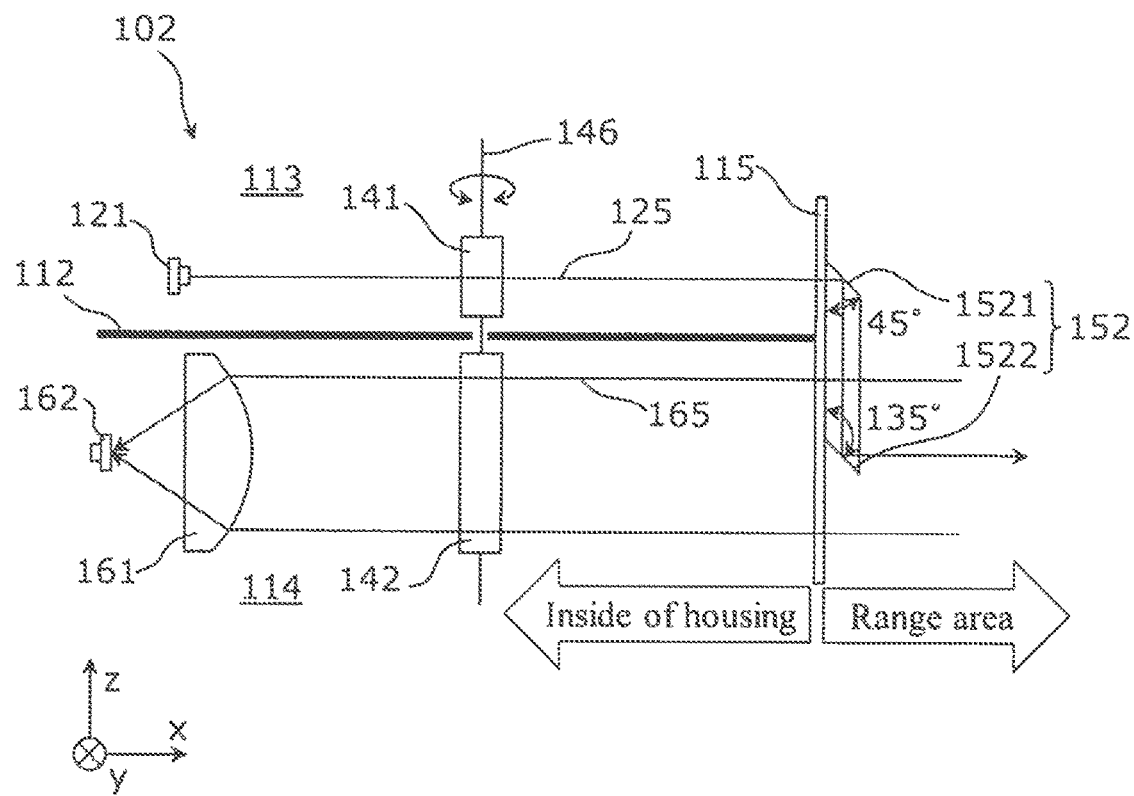
FIG. 8 is a side view drawing illustrating one example of the optical path of the measuring light and returning light of the laser device according to the first embodiment of the present invention.

FIG. 8 is a side view drawing illustrating an example of the optical path of the measuring light and returning light of the laser device 102. The side view drawing of FIG. 8 corresponds to the perspective view drawing of FIG. 3. In the laser device 102, as described above, the optical axis of the measurement light 125 is shifted close to the light receiver 160 by the optical axis shift part 152.

In either the laser device 101 or 102, the perspective parallax is reduced due to the measuring light 125 being emitted to the range area from a position close to the central axis (specifically, the central axis of the condenser lens 161) of the light receiver 160. Furthermore, stray light interference is also decreased, as the measuring light 125 and the returning light 165 are processed respectively by the light transmitting region 113 and the light receiving region 114 separated from each other by the shielding plate 112.

In addition, the position (in other words, the disposition height of the second reflection part 1512 and 1522) where the optical axis shift part 151 and 152 emits the measuring light 125 may be the same as the disposition height of the central axis (in other words, the central axis of the light receiver 160) of the condenser lens 161, and may also be different. In a case where the disposition height of the second reflection part 1512 and 1522 and the height of the optical axis of the light receiver 160 is the same, the perspective parallax can be minimized, and also, in a case where it is different, inconveniences where the second reflection part 1512 and 1522 becomes an obstacle, and the input amount to the light receiving element 162 of the returning light 165 is decreased can be reduced.

Furthermore, the second reflection part 1512 and 1522 may be positioned closer to the light receiver 160 than the shielding plate 112. Accordingly, the optical axis shift part 151 and 152 will emit the measuring light 125 from a height lower than the disposition height of the shielding plate 112. In other words, stray light interference is decreased by the shielding plate 112, while the measuring light 125 can be emitted from a position where the optical path of the light receiver 160 of the returning light is not blocked by the shielding plate 112.

Furthermore, in the aforementioned, an example where the optical axis shift part 151 and 152 is provided on the outer surface of the housing window 115 was described, however the optical axis shift part 151 and 152 may also be provided within the thickness of the housing window 115. In other words, the optical axis shift part 151 and 152 may be embedded on the housing window 115. Accordingly, results can be attained whereby perspective parallax is reduced and stray light interference is decreased.

A second embodiment of the present invention will be described in detail with reference to drawings.

Figure 9:
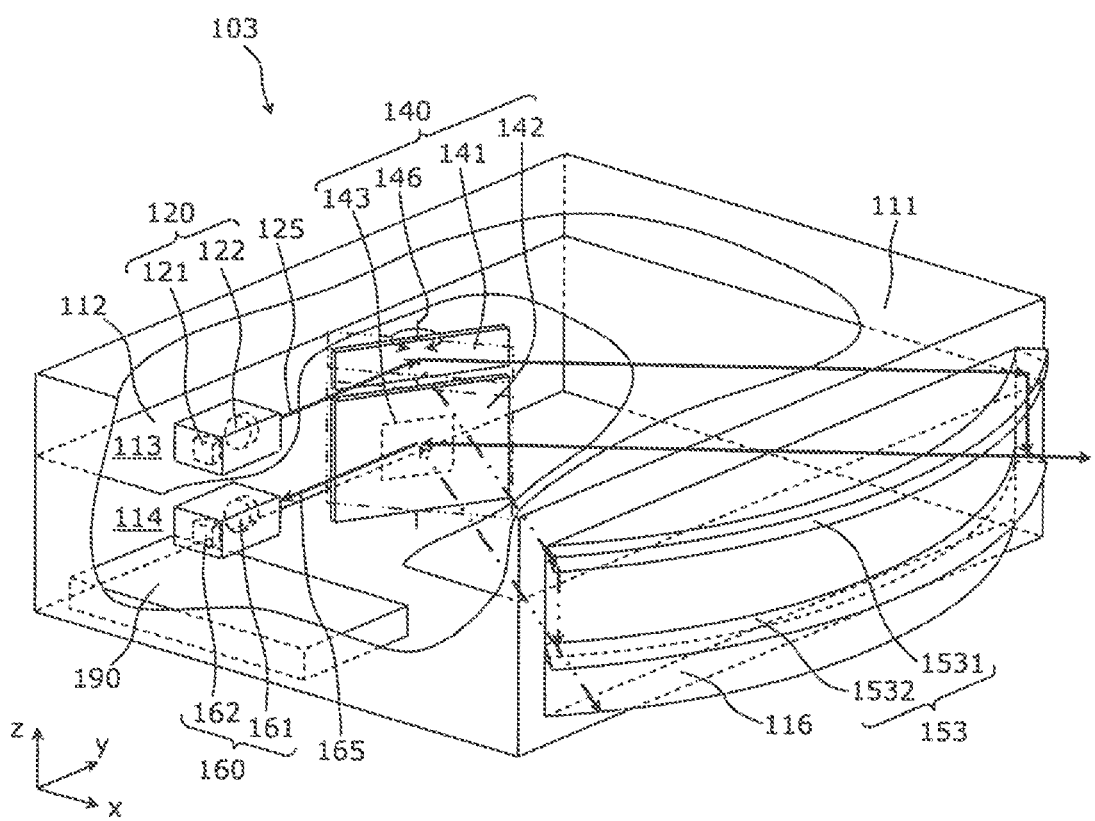
FIG. 9 is a cutout perspective view drawing illustrating one example configuration of the laser device according to a second embodiment of the present invention.

FIG. 9 is a cutout perspective view drawing illustrating an example configuration of a laser device 103 according to the second embodiment of the present invention.

As illustrated in FIG. 9, with regard to the laser device 103, the point where a housing window 116 is provided on a cylindrical shape as the center of the oscillating shaft 146 is different in comparison with the laser device 101 of FIG. 1. The shape of a first reflection part 1531 and a second reflection part 1532 configured of an optical axis shift part 153 has been changed, consequent upon changes to the shape of the housing window 116. The laser device 103 is the same as the laser device 101, with the exception of the point where the shape of the housing window 116 and the optical axis shift part 153 has been changed.

Configurations of the optical axis shift part 153 will be described in detail.

Figure 10:
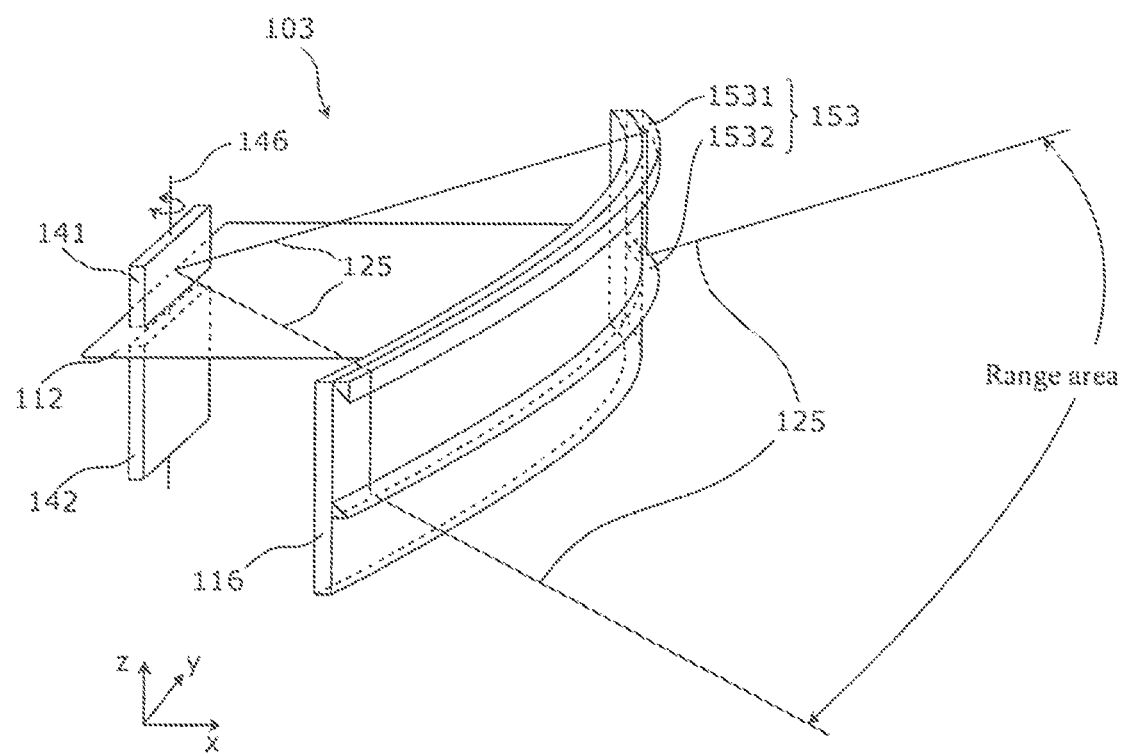
FIG. 10 is a perspective view drawing illustrating one example of a detailed configuration of the optical axis shift part according to the second embodiment of the present invention.

FIG. 10 is a perspective view drawing illustrating an example of a detailed configuration of the optical axis shift part 153.

As illustrated in FIG. 10, the first reflection part 1531 of the optical axis shift part 153 is disposed to curve along the housing window 116, in a position where the measuring light 125 intersects after being reflected by the light transmitting mirror 141. Specifically, the first reflection part 1531 is provided on the height of the central axis of the light transmitter 120, on the outer surface of the housing window 116, and it may have a long mirror, having a reflective surface, forming an outer surface for the housing window 116 at a 45-degree angle at any cross-section including the oscillating shaft 146.

Furthermore, the second reflection part 1532 is disposed in a position parallel to the first reflection part 1531, and at a height closer than the light receiver 160. Specifically, the second reflection part 1532 is provided parallel to the first reflection part 1531, and at a position lower than the first reflection part 1531, and it may have a long mirror, having a reflective surface, forming an outer surface for the housing window 116 at a 135-degree angle at any cross-section including the oscillating shaft 146.

The first reflection part 1531 and the second reflection part 1532 may, for example, be held at each end by a holding member (not illustrated) provided on the housing 111, and may be fixed in the aforementioned position of the housing window 116.

Accordingly, the optical axis of the measuring light 125 after being reflected by the light transmitting mirror 141 is bent in a direction parallel to the outer surface of the housing window 116 by the first reflection part 1531, and is once again bent and emitted in a direction parallel to the optical axis of the original measuring light 125 by the second reflection part 1532. In other words, the optical axis of the measuring light 125 is shifted to a height close to the light receiver 160 (specifically, the central axis of the light receiver 160) by the optical axis shift part 153, as illustrated in FIG. 9.

In the laser device 103, the optical path of the measuring light and the returning light illustrated in FIG. 10 is compatible with the optical path of the measuring light 125 and the returning light 165 at any cross-section including the oscillating shaft 146.

The optical axis shift part can be configured of a prism in place of a mirror. In the following, a modified example of such an optical axis shift part will be described.

Figure 11:
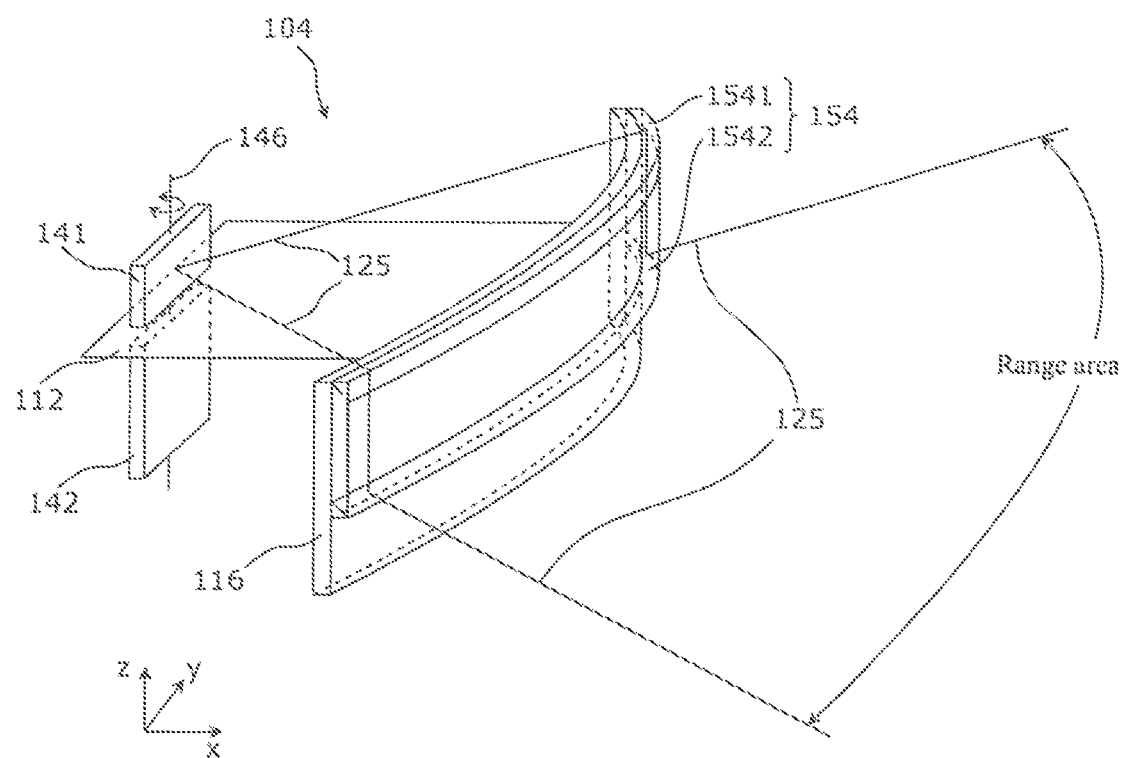
FIG. 11 is a perspective view drawing illustrating one example of a detailed configuration of the optical axis shift part according to the second embodiment of the present invention.

FIG. 11 is a perspective view drawing illustrating an example of a detailed configuration of an optical axis shift part 154 according to the modified example.

As illustrated in FIG. 11, the optical axis shift part 154 is configured of one prism curved along the housing window 116, and a first reflection part 1541 and a second reflection part 1542 are a pair of reflective surfaces provided on the prism.

The first reflection part 1541 is disposed in a position where the housing window 116 and the measuring light 125 intersect. Specifically, the reflective surface as the first reflection part 1541 may form the outer surface of the housing window 116 at a 45-degree angle at any cross-section including the oscillating shaft 146.

Furthermore, the second reflection part 1542 is disposed in a position parallel to the first reflection part 1541, and at a height closer than the light receiver 160. Specifically, the reflective surface as the second reflection part 1542 may form the outer surface of the housing window 115 at a 135-degree angle at any cross-section including the oscillating shaft 146.

The optical axis shift part 154 may, for example, be adhered to the housing window 115, or be held at each end by a holding member (not illustrated) provided on the housing 111, and may be fixed in the aforementioned position.

Accordingly, the optical axis of the measuring light 125 after being reflected by the light transmitting mirror 141 is bent in a direction parallel to the outer surface of the housing window 116 by the first reflection part 1541, and is once again bent and emitted in a direction parallel to the optical axis of the original measuring light 125 by the second reflection part 1542. In other words, the optical axis of the measuring light 125 is shifted to a height close to the light receiver 160 (specifically, the central axis of the light receiver 160) by the optical axis shift part 154, as illustrated in FIG. 11.

In the laser device 104, the optical path of the measuring light and the returning light illustrated in FIG. 11 is compatible with the optical path of the measuring light 125 and the returning light 165 at any cross-section including the oscillating shaft 146.

In this way, even in the laser device 103 and 104, results are exhibited whereby perspective parallax is reduced and stray light interference is decreased, as the optical path of the measuring light 125 and the returning light 165 of the side-view (cross-section view) is disposed equally to the laser device 101 and 102.

Moreover, horizontal parallax which can occur due to the laser device 101 and 102 can be cancelled by the laser device 103 and 104. In the following, horizontal parallax will be described, and results of the laser device 103 and 104 will be further described.

Figure 12:
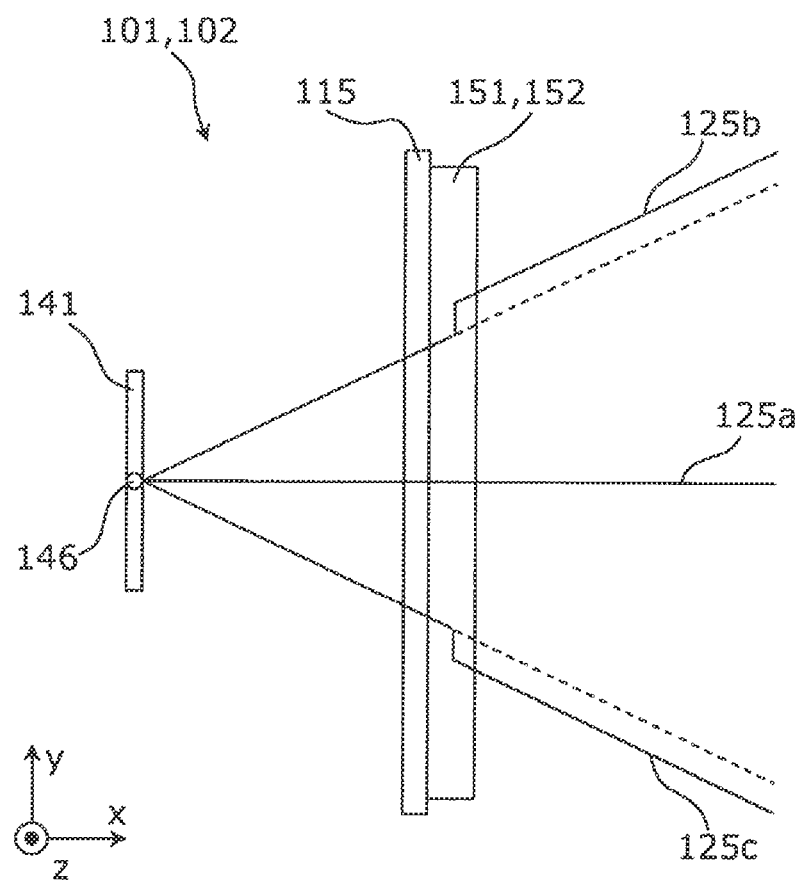
FIG. 12 is a top view drawing illustrating one example of the optical path of the measuring light of the laser device according to the first embodiment of the present invention.

FIG. 12 is a top view drawing illustrating an example of the optical path of the measuring light of the laser device 101 and 102. In the laser device 101 and 102, the optical axis shift part 151 and 152 is provided on the flat board housing window 115. As a result, the measuring light 125a input perpendicular to the optical axis shift part 151 and 152 from the light transmitting mirror 141 is emitted straight in the top view. On the other hand, a measuring light 125b and 125c input diagonally to the optical axis shift part 151 and 152 is shifted and emitted in a y-axis direction, by deviating to a y-axis direction between the first reflection part 1511 and the second reflection part 1512, and between the first reflection part 1512 and the second reflection part 1522 respectively.

In this way, the optical axis of the measuring light 125 is shifted to a greatly different y-axis direction according to emitting direction by the optical axis shift part 151 and 152. In this way, the optical axis shift of the measuring light 125 that occurs due to the greatly different y-axis direction due to the emitting direction is referred to as the horizontal parallax. The horizontal parallax, similar to the aforementioned perspective parallax, is a possible cause for measurement errors due to deviation of the condensing point.

Figure 13:
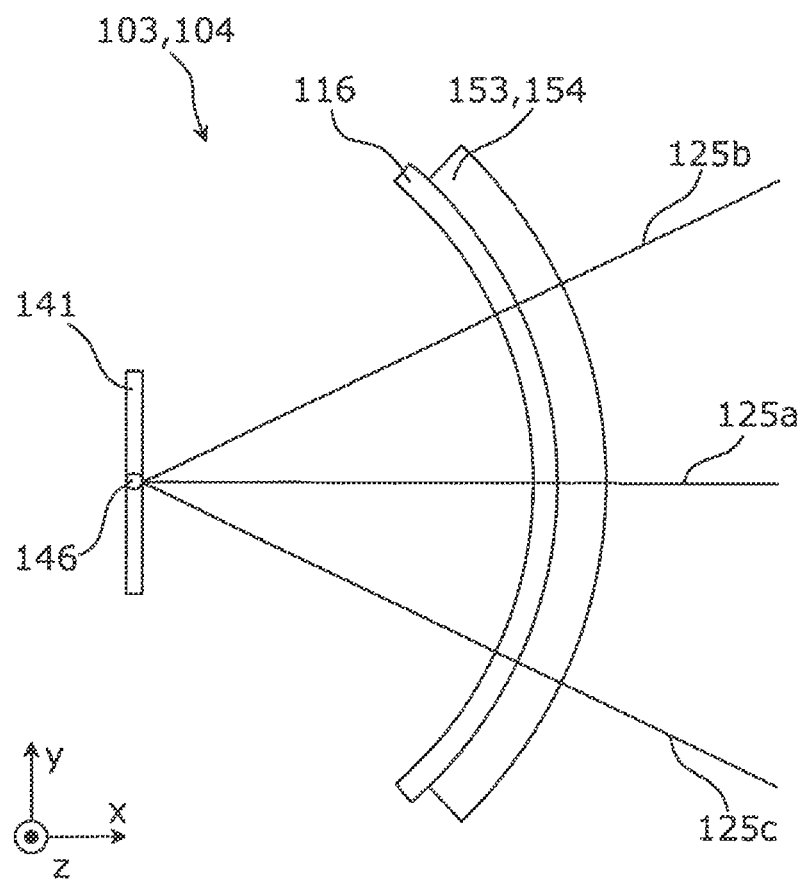
FIG. 13 is a top view drawing illustrating one example of the optical path of the measuring light of the laser device according to the second embodiment of the present invention.

FIG. 13 is a top view drawing illustrating an example of the optical path of the measuring light of the laser device 103 and 104. In the laser device 103 and 104, the optical axis shift part 153 and 154 are provided to curve around the cylindrical side surface shape housing window 116 as the center of the oscillating shaft 146. As a result, horizontal parallax does not occur in the optical axis shift part 153 and 154 as the measuring light 125 is input perpendicular, regardless of the emitting direction.

In addition, the housing window 116 does not have an exactly cylindrical side surface shape as the center of the oscillating shaft 146, and also the oscillating shaft 146 side need only have curvature constituting a concave surface. Accordingly, horizontal parallax can be reduced to an extent.

A third embodiment of the present invention will be described specifically with reference to drawings.

Figure 14:
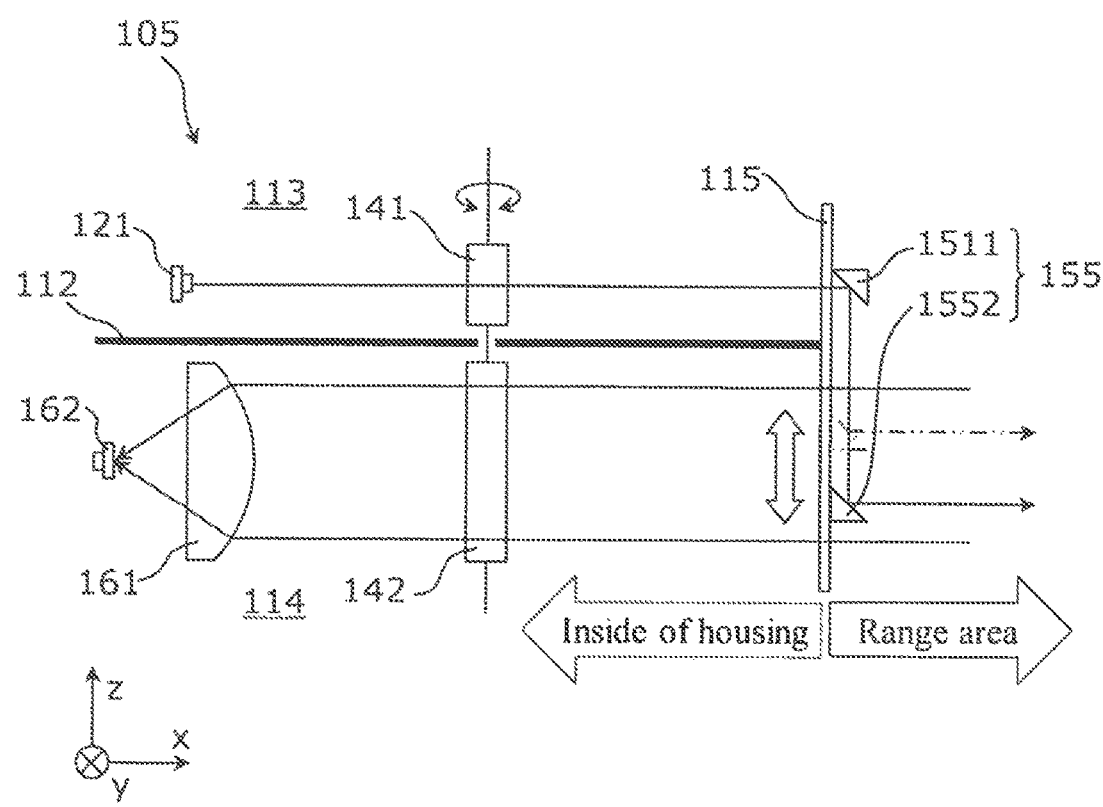
FIG. 14 is a side view drawing illustrating an example of the optical path of the measuring light and returning light of the laser device according to a third embodiment of the present invention.

FIG. 14 is a side view drawing illustrating an example of the optical path of the measuring light and returning light of a laser device 105 according to the third embodiment of the present invention.

As illustrated in FIG. 14, an optical axis shift part 155 of the laser device 105 is different in comparison with the laser device 101 of FIG. 7. The components are the same as the laser device 101, with the exception of the optical axis shift part 155 in the laser device 105.

The optical axis shift part 155 of the laser device 105 can be configured to change the height of the emitting position of the measuring light 125. The configuration of the optical axis shift part 155 is not particularly limited, however, as an example, both ends of a second reflection part 1552 are held by a moveable holding member (not illustrated) provided on the housing 111, and the second reflection part 1552 may be slid along the housing window 155. The first reflection part 1511 may be fixedly disposed on the housing window 115.

Accordingly, the height may measure the distance to a target object positioned on a plurality of different distance measurement surfaces by moving the second reflection part 1552.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

101, 102, 103, 104, 105, 801, 802, 803 Laser device
111 Housing
112 Shielding Plate
113 Light Transmitting Region
114 Light Receiving Region
115, 116 Housing Window
120 Light Transmitter
121 Light Source
122 Collimating Lens
125, 125a, 125b, 125c Measuring Light
129 Stray Light
140 Deflection Part
141 Light Transmitting Mirror (First reflector)
142 Light Receiving Mirror (Second reflector)
143 Actuator
146 Oscillating Shaft
148 Moveable Mirror
151, 152, 153, 154, 155 Optical Axis Shift Part (Guide part)
158 Perforated Mirror
159 Mirror
160 Light Receiver
161 Condenser Lens
162 Light Receiving Element
165, 165a, 165b Returning Light
190 Control Part 1511, 1521, 1531, 1541 First Reflection Part
1512, 1522, 1532, 1542, 1552 Second Reflection Part

What is claimed is:

1. A laser device, comprising:
    a transmitter that emits a light;
    a first reflector that pivotally reflects the light by a shaft;
    a light receiver provided apart from the transmitter in a first direction that is parallel to the shaft;
    a guide part that receives the light from the first reflector and changes a direction of the light in the first direction;
    a second reflector that reflects a returning light from an object and pivots in sync with the first reflector; and
    a housing comprising a window whereby the light and the returning light pass through,
    wherein the guide part is disposed on the window,
    wherein the guide part comprises a first reflection part and a second reflection part,
    wherein the first reflection part is disposed in a first position,
    wherein the second reflection part is disposed in a second position near the light receiver in the first direction, and
    wherein the second reflection part is moveable in the first direction.

2. The laser device according to claim 1, wherein the first position is a position where the window and the light intersect.

3. The laser device according to claim 1,
    wherein the first reflection part has a first side parallel to a second direction orthogonal to the first direction, and
    wherein the second reflection part has a second side parallel to the second direction.

4. The laser device according to claim 1, wherein the second reflection part is disposed at a same height as a central axis of the light receiver in the first direction.

5. The laser device according to claim 4,
    wherein the light receiver comprises a light receiving element, and
    wherein the central axis of the light receiver is a center axis of the light input to the light receiver from the second reflector and condensed in the light receiving element.

6. The laser device according to claim 1, wherein the second reflection part is disposed on a position different from a central axis of the light receiver in the first direction.

7. The laser device according to claim 6,
    wherein the light receiver comprises a light receiving element, and
    wherein the central axis of the light receiver is an optical axis of light input to the light receiver from the second reflector and condensed in the light receiving element.

8. The laser device according to claim 1,
    wherein the housing comprises a shielding plate, and
    wherein the second reflection part is disposed near the light receiver than the second reflector in the first direction.

9. The laser device according to claim 1, wherein the window is a planar shape parallel to the first direction.

10. The laser device according to claim 1, wherein the window is a cylindrical shape of which a center is the shaft.

11. The laser device according to claim 1,
    wherein the first reflection part comprises a reflective surface that forms the window at a 45-degree angle, and
    wherein the second reflection part comprises a reflective surface that forms the window at a 135-degree angle.

12. The laser device according to claim 1, wherein the first reflection part and the second reflection part are a mirror.

13. The laser device measuring apparatus according to claim 1, wherein the first reflection part and the second reflection part are disposed on a prism.

14. The laser device according to claim 1, wherein the window is made of resin or glass.

15. The laser device according to claim 1, wherein the guide part is disposed within a thickness of the window.

* * * * *